No. 764,712. PATENTED JULY 12, 1904.
H. S. CREDLEBAUGH & A. SONANDER.
FRICTION CLUTCH.
APPLICATION FILED SEPT. 12, 1903.
NO MODEL. 2 SHEETS—SHEET 1.
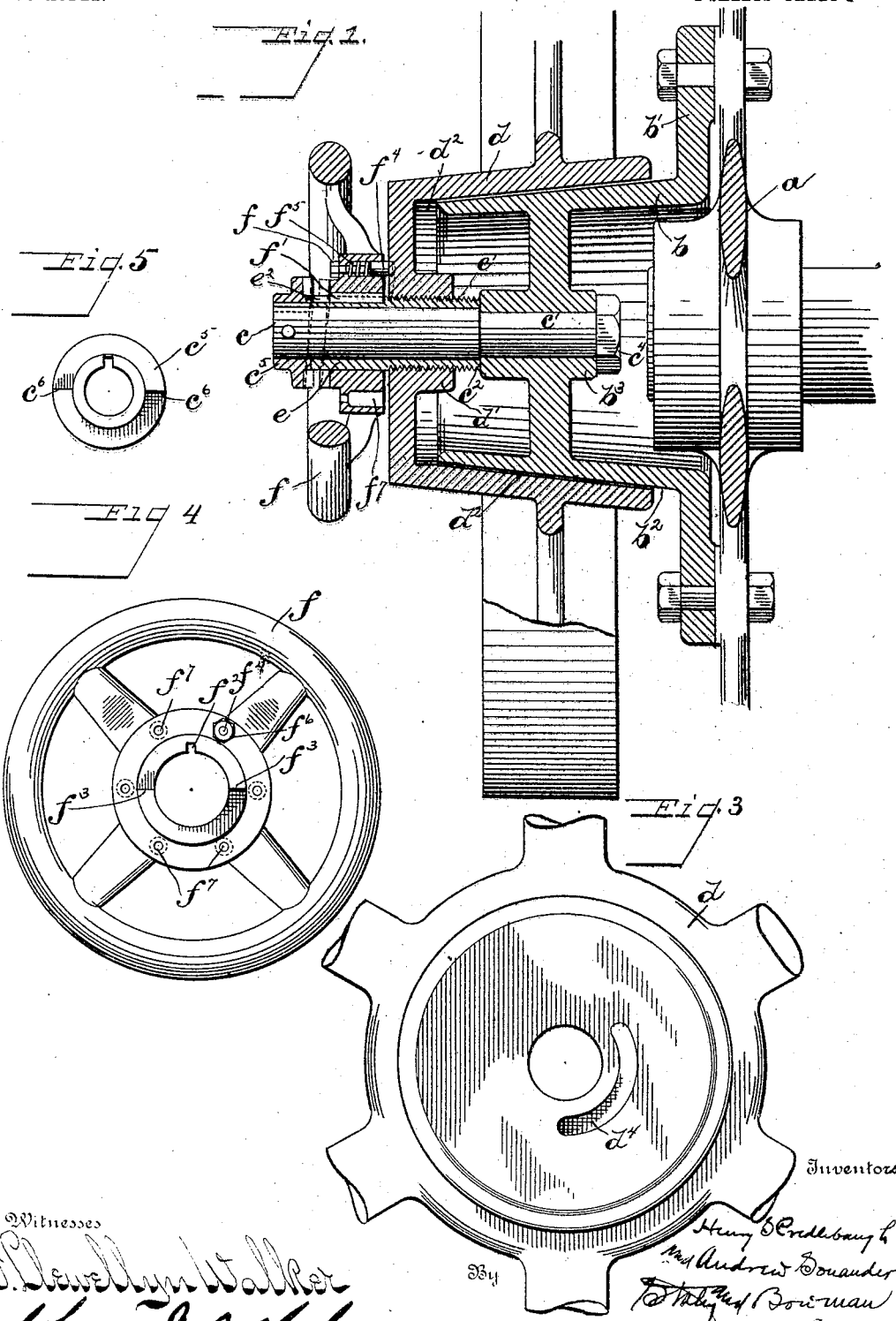

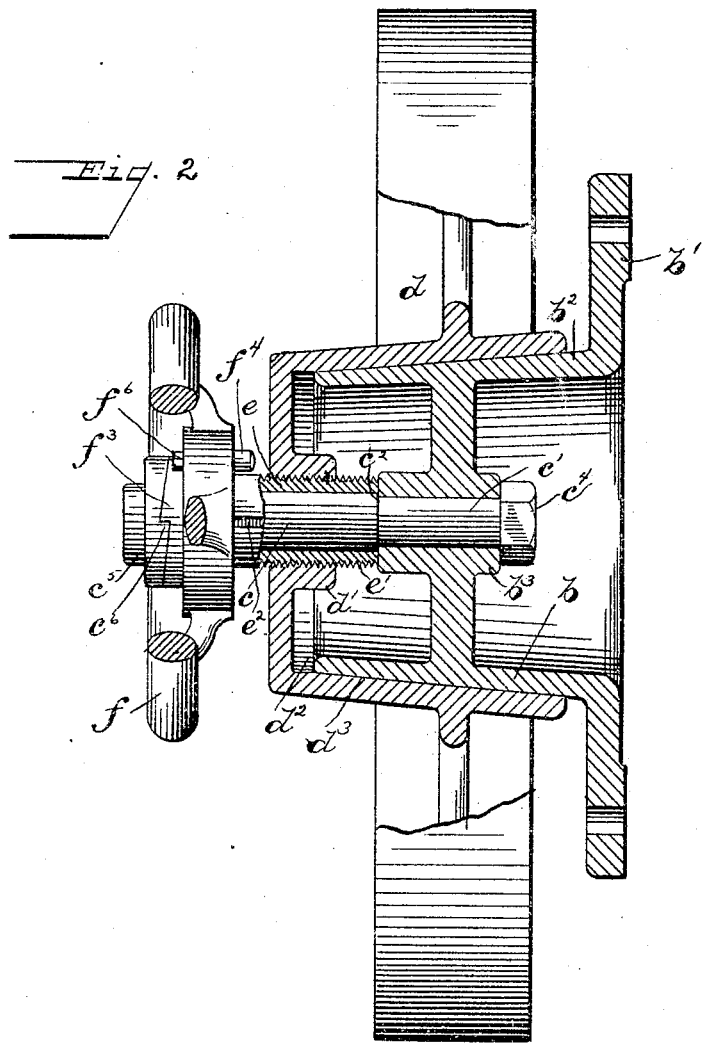

No. 764,712.                                    Patented July 12, 1904.

UNITED STATES PATENT OFFICE.

HENRY S. CREDLEBAUGH AND ANDREW SONANDER, OF SPRINGFIELD, OHIO, ASSIGNORS TO THE FOOS GAS ENGINE COMPANY, OF SPRINGFIELD, OHIO, A CORPORATION OF OHIO.

FRICTION-CLUTCH.

SPECIFICATION forming part of Letters Patent No. 764,712, dated July 12, 1904.

Application filed September 12, 1903. Serial No. 172,887. (No model.)

*To all whom it may concern:*

Be it known that we, HENRY S. CREDLEBAUGH and ANDREW SONANDER, citizens of the United States, residing at Springfield, in the county of Clark and State of Ohio, have invented certain new and useful Improvements in Friction-Clutches, of which the following is a specification.

Our invention relates to improvements in clutches, and particularly to clutches of the friction type, the object of our invention being to provide a clutch in which the power which drives the parts can be utilized to throw the clutch members into engagement with each other and also to provide means by which only the minimum amount of movement of the parts is required to engage and disengage said clutch members.

A further object of our invention is to provide a clutch which shall be simple in construction and effective in operation.

The invention consists in the constructions and combinations of parts hereinafter described, and set forth in the claims.

In the accompanying drawings, Figure 1 is a vertical sectional view of a device embodying our invention, showing the clutch members in their disengaged position. Fig. 2 is a similar view of the same, showing the parts in engaged position. Fig. 3 is a detail view of the end of the hub of the driving-pulley. Fig. 4 is a side view of the adjusting hand-wheel. Fig. 5 is a detail of the clutch-collar.

Like parts are represented by similar letters of reference in the several views.

In the said drawings, $a$ represents a part of a driving mechanism, such as, as shown in the present case, the fly-wheel of an engine. To this fly-wheel is secured by a spider $b'$ a friction driving member $b$, shown in this case as a friction-cone having its outer surface $b^2$ of a conical shape to form a frictional driving-surface. The cone $b$ has an inner hub $b^3$, and in this hub is secured the reduced end $c'$ of a stud $c$, said stud being formed with a shoulder $c^2$ to abut against the outer end of the hub and at the inner end of the hub with a screw-threaded portion to receive a nut $c^4$, by which the said stud is clamped firmly in said hub. Fitted loosely on said stud $c$ is a sleeve $e$, which extends from the hub $b^3$ to within a short distance from the outer end of the stud, said sleeve being screw-threaded, as shown, at $e'$ for substantially half its distance beginning at the end adjacent to the hub $b^3$. Threaded on this screw-threaded portion $e'$ of the sleeve is the driven member $d$ of the clutch, shown as the driving-pulley of the engine, said pulley being provided with a screw-threaded hub $d'$ for this purpose. The said hub $d'$ is extended to form a flaring chamber $d^2$, which fits over the cone $b$, the inner surface $d^3$ of said chamber corresponding to the outer surface of said cone, so as to form a frictional driving connection between the said pulley and cone when the parts are in engagement with each other.

To the outer end of the sleeve $e$ is connected an operating hand-wheel $f$, said wheel being connected to the sleeve by means of a spline $f'$, fitting in keyways formed in the said wheel and sleeve, respectively, as shown at $f^2$ and $e^2$. By means of this wheel the said sleeve can be turned on the stud $c$ to cause the pulley $d$ to travel thereon in either direction to throw the frictional driving-surfaces $b^2$ and $d^3$ in and out of engagement with each other.

In order to insure that a proper contact is made between the frictional driving-surfaces $b^2$ and $d^3$ to prevent any slipping of the parts which might occur when a heavy load is on the pulley, we have provided means for throwing the said frictional driving-surfaces into driving connection with each other by the power which drives the parts. To accomplish this, we have provided means for throwing the wheel $f$ into engagement with the shaft or stud $c$, said stud, as heretofore explained, being connected to the fly-wheel of the engine and always revolving therewith. This we do by securing to the outer end of the stud $c$ a clutch-collar $c^5$, having on its inner side clutch-faces $c^6$, the said collar being secured to the stud by a pin or spline, or both, as shown in the drawings. On the hub of the wheel $f$, at the side adjacent to said collar $c^5$, we have provided similar clutch-faces $f^3$. By means of its splined connection with the sleeve the wheel $f$ will be capable of a limited longitudinal movement on said sleeve, the said spline extending from the screw-threaded portion of the sleeve to the outer end of the sleeve, which comes adjacent to the collar $c^5$, said collar serving to hold the sleeve in position on the said stud. By moving said wheel, therefore, longitudinally on the sleeve until the clutch-faces $c^6$ and $f^3$ engage each other the wheel and sleeve will be revolved with the stud $c$. The revolution of the sleeve by said stud will cause the pulley $d$ to travel on the screw-threaded portion of said sleeve in a direction to bring its frictional driving-surface into engagement with the cone $b$, and as soon as a firm driving connection is established between the clutch members the parts will all revolve together. When it is desired to disengage the members of the clutch, the wheel $f$ is moved longitudinally inward on the sleeve, thus disengaging the clutches $c^6$ and $f^3$. By then grasping the wheel $f$ and arresting the revolution of the sleeve or giving it a slight turn in the opposite direction the pulley $d$ will be caused to move thereon in the opposite direction to disengage the said clutch members. Ordinarily the hub of the pulley in moving to its disengaged position would travel along the sleeve until it contacted with the hub of the wheel $f$ and the two hubs would become wedged or jammed together and be difficult to loosen up again. In order to prevent this, and also in order that a movement of the pulley from engaging position may be secured which will be just sufficient to properly disengage the two frictional driving-surfaces, so that a minimum amount of movement of the parts will at all times be required to throw them into or out of engagement, we have provided means to arrest the movement of said pulley along the sleeve at a point just removed from its engaging position with the cone and before it contacts with the hub of the wheel. Formed in the hub of the pulley $d$ on the side adjacent to the said wheel $f$ is a grooveway $d^4$, said grooveway being gradually deepened from the surface of the hub in the direction in which the wheel $f$ revolves when causing the pulley to travel to disengaged position and then terminating abruptly at its deepest portion. Seated in one of a series of recesses $f^7$ in the hub of the wheel $f$ is a pin $f^4$, said pin being reduced to receive a spring $f^5$, which fits between the shoulder formed on the pin and the bottom of the recess, the said reduced portion of the pin being extended through a perforation through the hub and screw-threaded to receive a nut $f^6$ to hold said pin in position in the recess. The said pin will normally project laterally from the hub of the said wheel. As before stated, when the wheel $f$ is pushed inwardly on the sleeve from its engaged position with the clutch-collar on the stud $c$ the operator by grasping the wheel firmly, so as to hold the sleeve $e$ stationary, will cause the pulley $d$ to travel on said sleeve, so as to disengage itself from the friction-cone, or, if the momentum of the pulley is not sufficient for this, the operator can give the wheel and sleeve a turn in the opposite direction to which it was revolving. This operation will cause the spring-pressed pin to enter the grooveway $d^4$ in the hub of the pulley, and as the pin reaches the end of said groove the movement of the parts will be arrested and the pulley will cease its movement along the sleeve from disengaging position with the cone.

In order to obtain the desired minimum amount of movement of the parts, as before stated, the said spring-pressed pin should be in a position with reference to the groove $d^4$ that it will enter the groove almost immediately after the wheel $f$ is shifted and grasped to cause the pulley to travel on the sleeve to disengage itself. Owing to the fact, however, that there is more or less wear on the frictional engaging surfaces, the relation of this pin to the groove will vary. It is on account of this variation between the relative positions of the pin and groove, therefore, that we have provided the series of recesses $f^7$, heretofore mentioned, in order that as from time to time the parts wear and the position of the pin changes in its relation to the groove the said pin can be shifted from one recess to another, and thus the same relation of the pin to the groove be maintained. By this construction the frictional driving-surfaces will never be separated in disengaging the same to an unnecessary degree, so that only a minimum amount of movement of the parts will be necessary to engage and disengage the clutch members.

While we have shown the frictional driving-surfaces of a conical form, other forms of surfaces may be employed, and we do not desire to limit ourselves, therefore, to the exact form shown. It is obvious that other details of our invention might be modified.

Having thus described our invention, we claim—

1. In a clutch, a driving member, a stud connected therewith, a loose screw-threaded sleeve mounted on said stud, and a driven member having a screw-threaded hub mounted on said sleeve, said driven member having a driving connection with said driving member, a driving connection between said stud and sleeve, and means for connecting and disconnecting said sleeve with said stud, substantially as specified.

2. In a clutch, a driving member, a stud connected with said member, a loose screw-threaded sleeve on said stud, a driven member having a frictional driving-surface to engage with said driving member and screw-threaded on said sleeve, a wheel connected with said sleeve and having a limited longitudinal movement with reference thereto, and means for connecting and disconnecting said wheel with said stud, for the purpose specified.

3. In a clutch, a driving member, a stud connected with said member, a loose screw-threaded sleeve on said stud, a driven member screw-threaded on said sleeve and having a driving connection with said driving member, a wheel splined to said sleeve and capable of a limited longitudinal movement with reference thereto, engaging clutches or teeth on the hub of said wheel, and a collar secured to said stud also having engaging clutches or teeth to engage with the clutches or teeth of said wheel when said wheel is moved to engaging position, for the purpose specified.

4. In a clutch, a clutch member, a spider connecting said clutch member to the driving mechanism, a pulley having a driving connection with said clutch member, a stud connected to said clutch member and adapted to be revolved thereby, a sleeve on said stud having a screw-threaded connection to said pulley to adjust same to and from engaging position with said clutch member, a driving connection between said stud and sleeve, and means for connecting and disconnecting said stud and sleeve, substantially as specified.

5. In a clutch, a driving member and a driven member, devices for moving one of said members to and from engaging position with the other, a spring-pressed pin on said devices adapted to engage with said movable member to stop the same at a predetermined distance in its travel from disengaging position, for the purpose specified.

6. In a clutch, a driving mechanism, a friction-pulley to engage with said driving mechanism, devices for adjusting said pulley with reference to said driving mechanism, a wheel connected with said devices, said wheel having means for limiting the movement of said pulley to regulate the distance which said pulley can be moved from engaging position with said driving mechanism, for the purpose specified.

7. In a clutch, a driving member, a driven member to engage with said driving member, said driven member being mounted upon a screw-threaded sleeve, a device for turning said sleeve to move said driven member to and from engaging position with said driving member, engaging devices between said driven member and said sleeve-operating device to arrest said parts when the driven member has moved a predetermined distance from engaging position with said driving member, and means for adjusting the said engaging devices to regulate this distance, for the purpose specified.

8. In a clutch, a driving member and a driven member, one of said members being movable with reference to the other for the purpose of throwing the parts into and out of engagement with each other, devices for operating said movable member, a spring-pressed pin on said devices, and a groove in said movable member to engage said pin, for the purpose specified.

9. In a clutch, a driving member, a driven member to engage with said driving member, a screw-threaded sleeve to receive the hub of said driven member, a wheel connected to said sleeve for operating the same, a spring-pressed pin in said wheel, and a groove in said hub to receive said pin when said sleeve is turned in a direction to move said driven member from disengaging position, for the purpose specified.

10. In a clutch, a driving member and a driven member, a stud connected to the driving member, a loose sleeve on said stud screw-threaded for a portion of its length, said driven member being provided with a screw-threaded hub mounted on the screw-threaded portion of said sleeve, a wheel splined to said sleeve and capable of a limited longitudinal movement thereon, clutch faces or teeth on said wheel, a clutch-collar secured to said stud, means for engaging and disengaging the said wheel with said collar, a spring-pressed pin on said wheel, a groove in said hub to receive said pin, and means for adjusting the position of said pin on said hub with reference to said groove, substantially as and for the purpose specified.

In testimony whereof we have hereunto set our hands this 3d day of September, A. D. 1903.

HENRY S. CREDLEBAUGH.
  ANDREW SONANDER.

Witnesses as to the signature of Henry S. Credlebaugh:
  CHAS. I. WELCH,
  F. LLEWELLYN WALKER.

Witnesses as to the signature of Andrew Sonander:
  CHAS. I. WELCH,
  CLIFTON P. GRANT.